United States Patent

[11] 3,631,783

| [72] | Inventor | Richard B. Jones<br>Highland, Calif. |
|---|---|---|
| [21] | Appl. No. | 794,722 |
| [22] | Filed | Jan. 28, 1969 |
| [45] | Patented | Jan. 4, 1972 |
| [73] | Assignee | Perfect Film & Chemical Corporation<br>New York, N.Y. |

[54] CASSETTE CAMERA
2 Claims, 13 Drawing Figs.

[52] U.S. Cl. .................................................. 95/31 FL,
  95/55, 95/31 FM
[51] Int. Cl. ............................................ G03b 19/04
[50] Field of Search ........................................ 95/11.5, 31,
  55

[56] References Cited
UNITED STATES PATENTS

| 438,943 | 10/1890 | Perry, Jr. .................... | 95/55 |
| 1,201,764 | 10/1916 | Richard ...................... | 95/55 |
| 2,811,907 | 2/1953 | Hyzer .......................... | 95/11.5 |
| 2,831,412 | 4/1954 | Friedman .................... | 95/11.5 |
| 3,247,773 | 4/1966 | Doblin et al. ................ | 95/31 |

Primary Examiner—Samuel S. Matthews
Assistant Examiner—Edna M. Bero
Attorneys—Kenneth S. Goldfarb, Walter C. Kehm and Samson B. Leavitt

ABSTRACT: A camera for use with film cassettes having an open-ended body adapted to releasably hold and be light sealed by a conventional film cassette is provided. The camera includes a winding knob secured to the body to permit manual advancement of the film in said cassette, a unique slidable two-blade lever operated shutter mechanism disposed in the body for selective exposure of each film frame, and a film frame positioning pin disposed in said body and adapted to successively engage a series of sprocket holes on the film corresponding to each frame to meter the film as it is advanced from frame to frame. The pin permits movement of the film only upon actuation of the shutter mechanism.

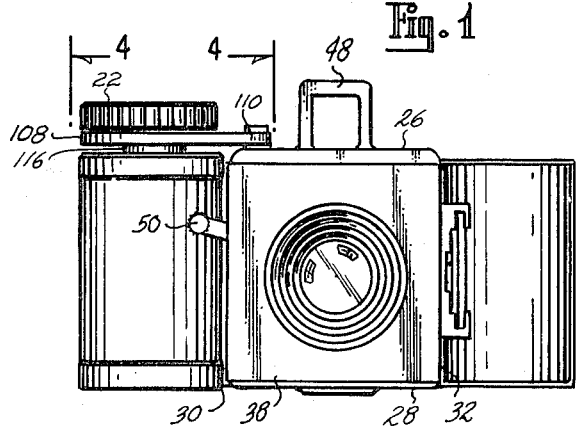
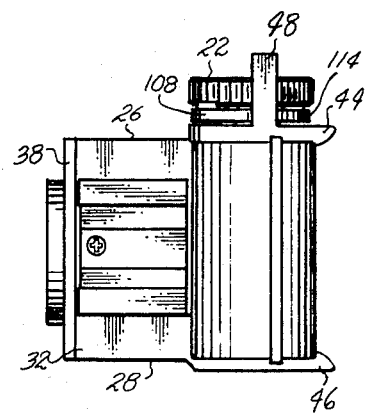
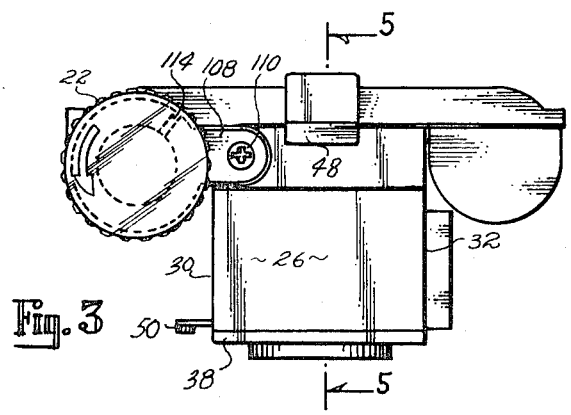
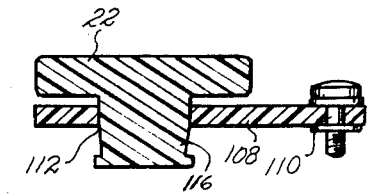
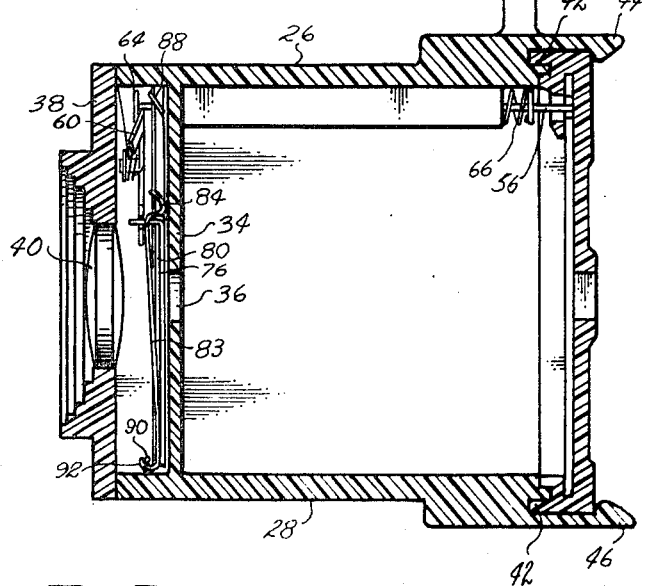

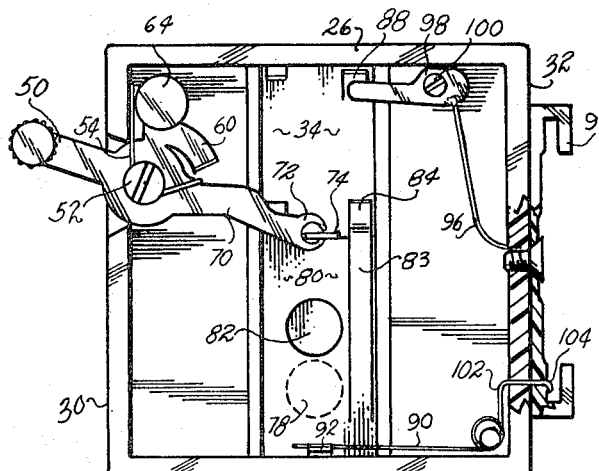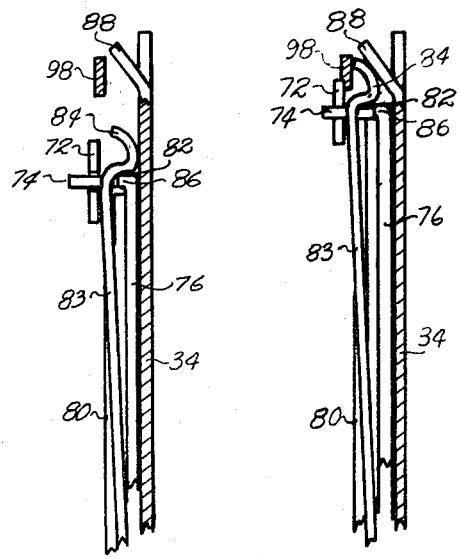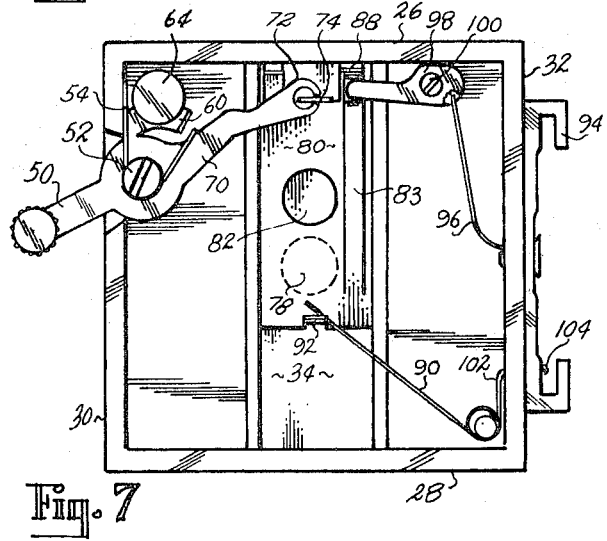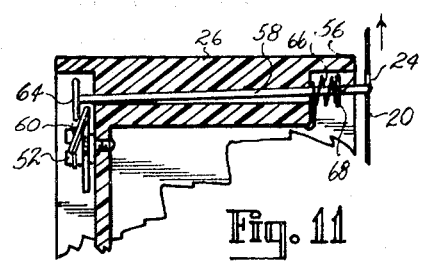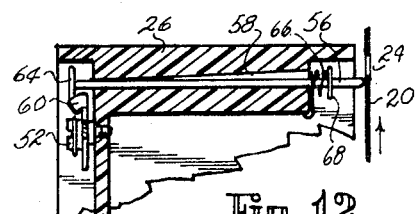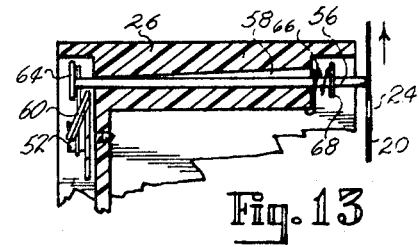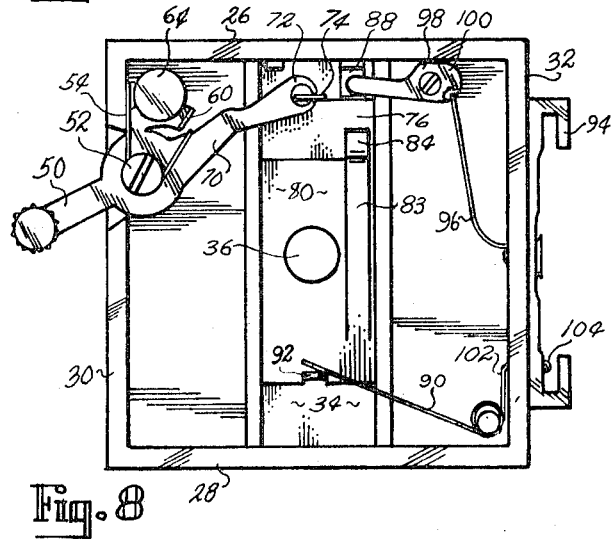
INVENTOR.
RICHARD B. JONES
BY LIONEL V. TEFFT
Attorney

CASSETTE CAMERA

One of the objects of the invention is to provide a small size camera complete in all respects that can be quickly attached to a conventional roll film cartridge for normal use without any modification whatsoever of the so-called cassette.

Another object of the invention is in the provision of a miniature-sized camera of relatively simple mechanical construction that can be snapped on a conventional cassette and the unit operated in the usual manner for excellent picture taking.

Still another object of the invention lies in the manner of connecting the camera to the cassette film advancing knob to prevent film unwinding.

Yet another object of the invention is in the provision of a simple but automatically operating film-positioning pin that is actuated by the shutter lever.

A further object of the invention is to provide a simple arrangement of shutter blades actuated by the shutter lever but rendered automatic by special shutter release and exposure mechanism.

A still further object of the invention is to provide mechanism for effectively mounting conventional electrically controlled flashlight apparatus and in connection with the camera body and its operating mechanism.

A careful consideration of the camera prior art and commercial devices indicate that there has never been a miniature or small pocket-sized complete camera that could be quickly detachably connected to a conventional roll film cartridge or cassette without any modification whatsoever of the cassette.

Applicant's camera is simply constructed and may be manufactured at low cost. It is easily attached to the cassette for normal use and there is also a releasable means for engaging the film-advancing knob to prevent undesired film unwinding. The camera is of special design when the shutter blade and exposure mechanism is considered as well as the film-positioning pin that has a unique manner of film aperture engagement. The novel camera mechanism will be described in detail but it must be kept in mind that this is the first practical step in the development of cassette cameras that will meet all tests of satisfactory use and result.

These and other objects and advantages of the present invention will become apparent to those skilled in the art upon consideration of the following detailed description of the preferred embodiment thereof, reference being made to the accompanying drawings, herewith wherein:

FIG. 1 is a front elevational view of the small cassette attached camera;

FIG. 2 is a side elevational view;

FIG. 3 is a plan view from above;

FIG. 4 is an enlarged partial sectional view taken on line 4—4 of FIG. 1 of the releaseable arm providing a frictional means preventing unwinding of the cassette knob and film;

FIG. 5 is a view taken on the line 5—5 of FIG. 3;

FIG. 6 is an elevational, certain portions being removed, of the shutter lever connected to the positioning pin and shutter blades in inactive position;

FIG. 7 is the same view showing the actuating lever finger depressed and actuating the film-positioning pin and shutter blades just prior the film exposure;

FIG. 8 is a view showing the outer shutter blade released and falling to instant film exposure position prior to assuming the position of FIG. 6;

FIG. 9 is a partial enlarged view showing the position of the shutter blades in FIG. 6;

FIG. 10 is a similar view showing the position of the shutter blades in FIG. 7;

FIG. 11 is a partial sectional enlarged view showing the normal inactive film aperture engaging position of the pin;

FIG. 12 is a similar view showing the position of the pin in an adjacent under the film position assumed upon manual depression of the shutter lever; and FIG. 13 shows the position of the pin as the film is advanced and is to be automatically engaged by the pin when a subsequent aperture is reached.

Referring specifically to the drawings in which a preferred embodiment of the invention is disclosed, it is apparent that a miniature box-type camera of special construction is releasably attached to a conventional film package usually referred to as a cassette. The film package or cassette is adapted for use in other well-known types of cameras and is sold as a separate unit throughout the world. Applicant desires to adapt a special type miniature or pocket size camera to the conventional cassette rather than the film package to the conventional camera.

This is accomplished by designing a unique quick attachable and detachable miniature camera to the conventional cassette so that the user may purchase a low-cost miniature but excellent camera at a relatively small cost that may be carried in his pocket or otherwise and quickly attached to a conventional film package or cassette whenever it is desired. The resulting pictures taken are normal in all respect and may be finished in the usual manner. The combination of the cassette and miniature camera and manner of use is new in all respects. The results obtained including the simplicity of operation and low cost opens an entirely new field in the use of camera apparatus.

In FIGS. 12, 3, 3 and 4, the conventional film package and parts thereof are clearly shown. It is not believed necessary to describe in anything but a general way this well-known film package which is known to all camera users. It is a unitary film package in which the film 20 is advanced intermittently as desired by means of a knurled knob 22. There are spaced apertures 24 insuring picture location by means of pin engaging and releasing means. Applicant makes no change whatsoever in the construction of this well-known film cartridge.

The novelty in the invention lies in the construction of a simple, quick detachable miniature camera to the cassette so that an excellent picture may be obtained by easy joinder of the two elements. There is no difference from ordinary camera operation. The operator joins the units, trains the camera in the usual manner on the object desired and presses the shutter-actuating lever. When a picture has been taken, the film is advanced in the usual manner until the film is secured automatically in position for the next exposure and so on and so forth.

The little camera, almost less than pocket size, is of the box type and has a top 26, bottom 28 and sides 30 and 32. An exposure plate 34, with exposure opening 36 is spaced from the conventional lens plate 38 on the front of the camera which carries the standard lens 40. The rear open edges of the box camera are fashioned to engage as shown at 42 conventional projection of the cassette so that a lightproof connection is accomplished. The top 26 and bottom 28 has rearward projecting flexible latches 44 and 46 respectively that releasably grasp the film cartridge or cassette as best shown in FIG. 5. This manually adjustable connection could be accomplished in other manner than as described without changing the fundamental theory of the present invention. A view scope 48 may be mounted on the camera top 26.

The camera-actuating means are simple in construction. They conform in use to common camera operation but they are entirely different in specific structure and operation in that they adapt the miniature camera to successful operation when combined with the cassette or film cartridge. A camera-shutter-actuating member 50 is operated manually in the usual manner. This lever 50, is pivoted at 52 and sustained in a spring positioned normal manner at 54. The mechanism hereafter referred to is entirely new and novel.

In the present case, the shutter-actuating lever 50 is automatically connected to a film-positioning pin 56 slideable in an opening 58 in the top 26 of the camera body. The shutter-actuating lever 50 has a cam member 60 thereon that is engageable with a circular or otherwise extension 64 on the inner end of the film-positioning pin 56 which at its outer end projects in and is withdrawn from the spaced apertures 24 in the film 20 by means of the said cam 60. In other words when the lever 50 is manually actuated, the positioning pin 56 is withdrawn from the aperture 24 as shown in FIG. 12 by means of the special spring 66 secured at 68, which normally projects the pin rearwardly. The pin 56 is also moved sidewardly by action of spring 66 to engage the adjacent inner side of the film as clearly shown, FIG. 12, whereby after film exposure, the film may be advanced until the positioning pin 56 is ready to automatically engage a following aperture as shown in FIG. 13.

An inner arm 70 on the pivoted actuating lever 50 has a pincer grip 72 that engages a projection 74 on an inner or rearward shutter blade 76 having an exposure opening 78 therein. An outer or forward shutter blade 80 immediately adjacent and slideable with an on blade 76 also has an exposure opening 82. The blade 80 has a flexibly secured latch member 83 projecting thereabove and having the curved portion 84 thereof normally overlying the upper edge 86 of the inner shutter blade 76 as shown in FIG. 9. A projecting cam surface 88 on the exposure plate 34, as shown in FIG. 10, operates to release the latch 82 on the outer blade shutter 80 when the inner and outer shutter blades have been moved jointly by the pincer 72 to their most elevated position where the exposure opening 78 will coincide with the exposure opening 36 in the plate 34 as shown in FIG. 7. The inner shutter blade 76 will be held in the upper position, FIG. 7, for an instant, while the outer shutter blade 80 is released and drops and thereafter when the actuating lever 50 is manually released, the blade 76 will drop to normal inactive position shown in FIG. 6.

When the outer shutter blade 80 is released by operation of the latch 82 and cam 88 it will fall under the additional influence of spring 90 on a projection 92 on the lower edge of the blade and for an instant the exposure opening 82 therein will coincide with the opening 78 on inner shutter blade 76 and the exposure opening 36 on the plater 34. The film is exposed for an instant to take a picture in the usual manner.

Means is provided for taking photoflash pictures. A bracket 94 is attached to or formed as a part of the sidewall of the camera. The bracket 94 will take conventional flash mountings. An electrical circuit to complete the electrical actuation of the conventional flash mechanism is provided in a wire 96 connection to an arm 98 secured at 100 to the camera and capable at its outer end of contacting the latch portion 84 just as the outer shutter blade 80 is released. The electrical circuit to the flash bracket 94 and flash mounting is completed through the latch 83, outer shutter blade 80, spring wire 96 and finally through a second wire portion 102 to the bracket 94 at 104.

As stated, the film package, cartridge or cassette is conventional in all respects but applicant provides an additional brake or friction clutch for the manually actuated knurled knob 22 which advances the film intermittently as desired by the operator. The film has a tendency to unwind and to overcome this defect applicant pivots a bar 108 at 110 on the top of the camera. The bar 108 is apertured at 112 and split at 114 to form a friction connection with the tapered hub 116 of the knob 22. The connection is made by releasing the knob 22 from the cassette and inserting it in the opening 112 in the bar 108. The knob 22 is then moved to coincide with the cassette film connection opening and forced downwardly for active engagement therewith.

The operation of the miniature cassette camera has been specifically described but it is desired to generally connect up the several movements. In the first place, it is perfectly obvious that the small, less than pocket size camera may be snapped on the conventional film cartridge and the connection made with film-advancing knob to prevent film unwinding. The little camera is operated in a perfectly normal manner even if flashlight mechanism is attached to the bracket.

When the spring-tensioned actuating lever is depressed to take the picture and then released in the usual manner, a sequence of new and unique operations take place. The film-positioning pin is withdrawn and assumes a slight sideward position; FIG. 11, under the film and adjacent a conventional film-positioning aperture. Upon depression of the actuating lever, the inner and outer blade shutters are elevated to the position of FIG. 7, with the inner blade exposure aperture coinciding with the conventional plate exposure opening. The latch on the outer blade shutter is released. The blade drops under spring pressure and for an instant all exposure openings coincide and the film is exposed to take the picture in the usual manner. When the actuating lever is released the shutter elements assume their nonactive position of FIG. 6, and the operator may then or later manually actuate the film-advancing knob to move the film from the position of FIG. 12 to a position such as FIG. 13 where the positioning pin is about to engage a film aperture. The pin finally engages the film aperture as shown at FIG. 11 and holds the film stationary for the next picture. Any subsequent operation with respect to the picture taking is entirely conventional. The miniature camera is easily detached when desired.

While I have described in considerable detail what I believe to be the preferred form of my invention, it will be understood by those skilled in the art that various changes may be made in the shape and arrangement of the several parts.

I claim:

1. A camera for use with film cassettes comprising:
   a. a body having an open open rear portion adapted to releasably hold and be light sealed by a film cassette;
   b. a lens mounted in the body and positioned to focus an image on film disposed in said cassette;
   c. a winding knob secured to said body and adapted to permit manual advancement of the film in said cassette from frame to frame and to prevent unwinding of the film in said cassette;
   d. a shutter mechanism disposed in the body between the lens and the open rear portion for selective exposure of each film frame in said cassette, said shutter mechanism comprising:
      1. an outer rectangularly shaped shutter blade having an aperture therein and slidably moveable between first and second positions in a plane perpendicular to the optical axis of and adjacent to said lens;
      2. biasing means positioned to normally urge the outer blade toward said first position;
      3. an inner rectangularly shaped shutter blade having an aperture therein which is normally not aligned with the aperture of said outer plate, said inner blade being slidably moveable between first and second positions in a plane parallel to the plane of said outer blade and inwardly thereof, said inner blade including a perpendicularly disposed projection extending therefrom;
      4. a resilient latch member secured to said outer blade adapted to hold the inner and outer blades together for simultaneous movement from their first to their second positions against the biasing means of the outer blade, and to release the outer blade when it reaches the second position, permitting it to be rapidly returned to the first position by said biasing means, the apertures of the inner and outer blades being aligned to permit exposure of the film during the return movement of said outer blade; and
      5. an actuating lever pivotally mounted on said body and having one end extending to the exterior to permit manual depression thereof and another end having a pincerlike formation adapted to slidably grip the perpendicular projection on said inner blade, so that depression of said exterior end causes sliding movement of said inner blade to its second position, thus actuating the shutter to expose the film, said lever further including an inclined cam surface on an interior portion thereof; and
   e. a film frame positioning pin disposed in said body extending from the shutter mechanism toward the film cassette, and adapted to successively engage a series of sprocket holes on the film corresponding to each frame to meter the film as it is advanced from frame to frame by said winding knob, said pin being normally urged into engagement with the film by biasing means and having a head at one end for engagement with the inclined cam surface of the actuating lever, so that it is cammed out of engagement with the film upon actuation of the shutter to permit advancement of the film.

2. A camera in accordance with claim 1, further comprising a photoflash-mounting bracket extending from the body; and an electrical circuit for the photoflash having switch connectors adapted to complete the circuit as the outer shutter blade is released for film exposure.

* * * * *